United States Patent [19]

Murakami et al.

[11] Patent Number: 5,202,770
[45] Date of Patent: Apr. 13, 1993

[54] PICTURE CODING APPARATUS INCLUDING A CODING CONTROLLER FOR SELECTING CODING BETWEEN BLOCKS AND FRAMES OF IMAGE DATA

[75] Inventors: Tokumichi Murakami; Kazuhiro Matsuzaki, both of Kanagawa, Japan

[73] Assignee: Mitsubishi Denki Kabushiki Kaisha, Tokyo, Japan

[21] Appl. No.: 605,362

[22] Filed: Oct. 30, 1990

[30] Foreign Application Priority Data

Nov. 6, 1989 [JP] Japan .................... 1-288180

[51] Int. Cl.$^5$ .............................. H04N 7/12
[52] U.S. Cl. ...................... 358/426; 358/430
[58] Field of Search ............ 358/426, 430; 382/56, 382/41; 341/51

[56] References Cited

U.S. PATENT DOCUMENTS

| 4,386,366 | 5/1983 | Mori | 358/430 |
|---|---|---|---|
| 4,581,656 | 4/1986 | Wada | 358/426 |
| 4,677,479 | 6/1987 | Hatori et al. | 358/426 |
| 4,746,978 | 5/1988 | Shimura | 358/426 |
| 4,785,356 | 11/1988 | Gonzales et al. | 358/430 |

FOREIGN PATENT DOCUMENTS

7337987 11/1989 Australia .

OTHER PUBLICATIONS

"Motion Video Coding in CCITT SG XV-The Video Source Coding" Ronald Plompen, Yoshinori, Wilfried Geuen, Jacques Guichard, Mario Guglielmo, Harald Brusewitz pp. 997–1004.

"Scene Adaptive Coder"–Wen-Hsiung Chen and William K. Pratt IEEE Transactions on Communications, vol. Com. 32, No. 3, Mar. 1984–pp. 225–231.

Article Entitled "Interframe Coding Using Adaptive Vector Quantizer" to Murakami et al (Translation Included) dated Mar. 4, 1984.

*Primary Examiner*—Stephen Brinich

[57] ABSTRACT

A coding controller takes a buffer occupancy at present from a transmission buffer, and a first normalized value evaluating device outputs a first normalized value, independent of a video rate. A frame rate for the number of bits per block ($n \times QB$) is determined and a second normalized value evaluating device outputs a second normalized value for the number of bits per one frame. When the number of bits is relatively small, a second quantization characteristics control table is selected in a selector and the coding control is performed every frame. When the number of bits is large, a first quantization characteristics control table is selected in the selector and the control is performed every block ($n \times QB$), instead of the control every frame. The quantization characteristics control signal is then outputted.

12 Claims, 5 Drawing Sheets

PICTURE CODING APPARATUS INCLUDING A CODING CONTROLLER FOR SELECTING CODING BETWEEN BLOCKS AND FRAMES OF IMAGE DATA

BACKGROUND OF THE INVENTION

1. Field of the Invention

The present invention relates to a picture coding apparatus which is intended for high efficiency coding of digital video signals.

2. Description of the Prior Art

FIG. 1 is a block diagram showing the constitution of a picture coding apparatus in the prior art operating at a definite transmission rate, such as disclosed in Murakami, Asai et al. Interframe Coding using "Adaptive Type Vector Quantizer" in Technical Report IE84-1 of the Institute of Electronic and Communication Engineers in Japan (Apr. 3, 1984). In FIG. 1, the apparatus comprises a frame skip processor 1 for performing a frame skip processing to an input picture data 101 per each frame:a subtractor 11 for performing subtraction between a remaining input picture data 102 after the frame skip processing and an interframe prediction signal 107; a quantizer 2 for blocking an interframe differential signal 103 output from the subtractor 11 and then quantizing the block [hereinafter referred to as "quantization block (QB)"] using prescribed quantization characteristics assigned by a quantization characteristics control signal 112 and outputting a quantization index 104; a quantization decoder 3 for decoding the quantization index 104 using the quantization characteristics control signal 112 and outputting a decoded differential signal 105; an adder 12:a frame memory 4 for generating the interframe prediction signal 107; a variable word length coder 5; a transmission buffer 6 for outputting a transmission picture data 113; and a conventional coding controller 7b for controlling the frame skip in the frame skip processor 1 according to a buffer occupancy 108 of the transmission buffer 6 and control of the quantization characteristics in the quantizer 2.

Next, operation will be described. First, in the frame skip processor 1, frame skip processing is performed to input picture data 101, per each frame, according to a frame skip control signal 111 assigning the number of frame skip. A remaining input picture data 102 outputted from the frame skip processor 1 is subjected to subtraction of an interframe prediction signal 107 in the subtractor 11 at the rear stage. As a result, an interframe differential signal 103, reduced in temporal redundancy, is generated. In the quantizer 2, the interframe differential signal 103 is divided into quantization blocks QB, and every n×QB (n: natural number) (every prescribed quantization blocks) or every frame, quantization of the quantization blocks QB is performed using prescribed quantization characteristics assigned among a plurality of quantization characteristics using a quantization characteristics control signal 112. The conventional coding controller 7b outputs a frame skip control signal 111 and a quantization characteristics (quantization step size) control signal 112 according to a buffer occupancy 108 of the transmission buffer 6. FIG. 2 is a block constitution diagram of the conventional coding controller 7b. Reference numeral 81 indicates a third quantization characteristic control table. The relationship of the buffer occupancy 108 and the quantization characteristics (quantization step size) G and the number of the frame skip M is shown as follows:

B:small→G and M:small (→number of bits created by coding I:increase)

B:large→G and M:large (→number of bits created by coding I:decrease).

The quantization index 104 and the quantization characteristics control signal 112 are coded and multiplexed in the variable word length coder 5, and transmitted to the transmission buffer 6, and temporarily stored. They are and then transmitted as transmission picture data 113. In the quantization decoder 3, the quantization index 104 is decoded using the quantization characteristics control signal 112, and as a result of decoding the quantization index 104, a decoded differential signal 105 is outputted to the adder 12. The interframe prediction signal 107 is added to the decoded differential signal 105 by the adder 12, and a decoded video signal 106 is generated. In the frame memory 4, the decoded video signal 106 is subjected to the frame delay and outputted as the interframe prediction signal 107.

Since the picture coding apparatus in the prior art is constituted as described above, the interframe differential signal is divided into the quantization blocks QB, and the decoding control every n×QB or every frame is performed, according to the buffer occupancy. Consequently, problems exist in that when the control is performed every n×QB, the picture quality may become ununiform, locally, resulting in deterioration of the subjective quality. Further, when the control is performed every frame, since the coding control is delayed, a larger step size may be selected or the frame skip may occur frequently.

In other words, the coding control every frame is advantageous in that relatively uniform quality is obtained in the coded picture and the control is performed to the fluctuation for a long period of the number of bits created by coding the picture depending on the content of the scene. However, it is disadvantageous in that as the number of bits created by coding increases, the jerky picture frame is liable to occur accompanying with the increase and the significant fluctuation of the number of frame skips. On the other hand, in the coding control of every block (n×QB) where one picture frame is blocked (for example, 4 pixels by 4 lines), advantages exist in that the number of frame skips is relatively constant and the control is performed to the fluctuation for a short period of the number of bits created by coding the picture in each portion of the scene. However, disadvantages exist in that the coding distortion is concentrated to a specific portion on the picture frame and an unnatural picture quality is liable to occur.

SUMMARY OF THE INVENTION

In order to solve the above-mentioned problems in the prior art, an object of the present invention is to provide a picture coding apparatus wherein the local deterioration of the picture quality is prevented and the delay of the coding control is decreased.

In order to attain the foregoing object, in a picture coding apparatus according to one aspect of the invention, a coding controller for receiving the degree of buffer occupancy at present from a transmission picture data output means and for outputting the quantization characteristics control signal, comprises means for calculating the number of bits created by coding the first prescribed processing unit, means for calculating the number of bits created by coding the second prescribed processing unit, and means for determining one among a plurality of quantization characteristics based on the above-mentioned two numbers of bits created by coding.

The coding controller also comprises a frame skip controller for outputting frame skip control signals according to the buffer occupancy.

The coding controller further comprises a normalization section for normalizing the above-mentioned two numbers of bits created by coding, so that the means for determining the quantization characteristics determines one among a plurality of quantization characteristics using the normalized output from the normalization section.

The foregoing and other objects and novel features of the invention will be more fully apparent from the following detailed description when the same is read in connection with the accompanying drawings.

DETAILED DESCRIPTION OF THE PREFERRED EMBODIMENTS

Figure 1:
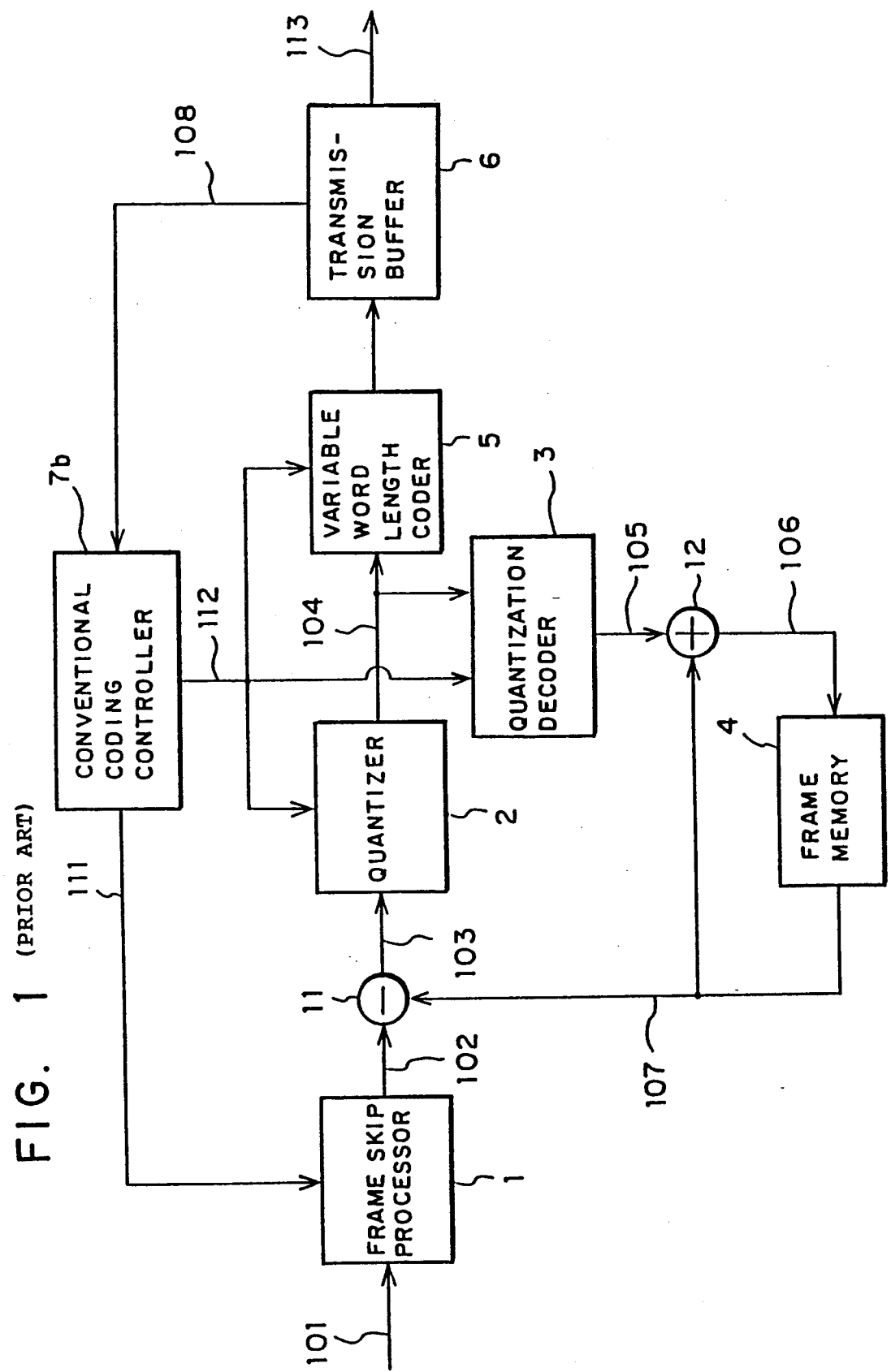
FIG. 1 is a block diagram illustrating constitution of a picture coding apparatus in the prior art.
Figure 2:
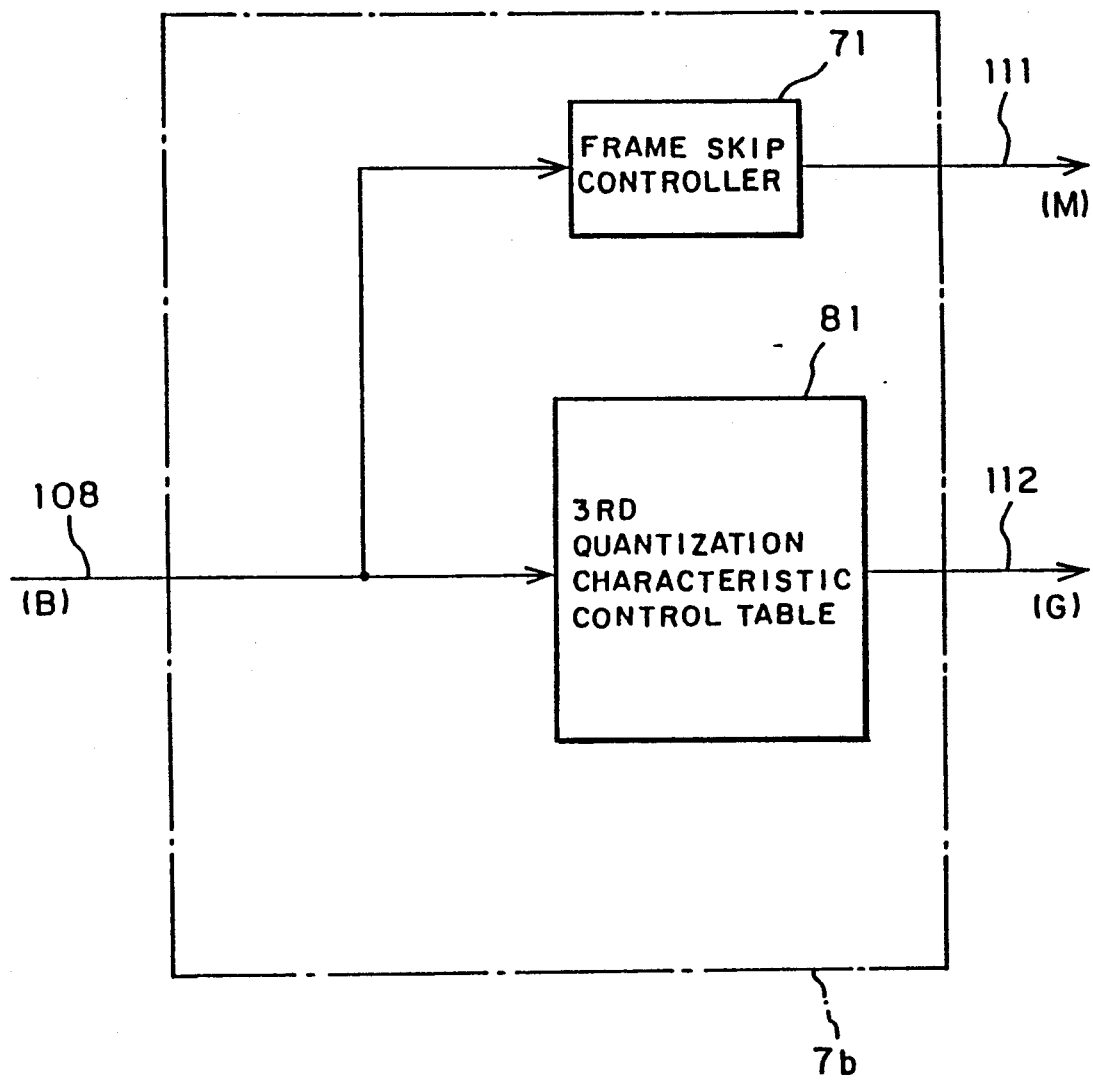
FIG. 2 is a block diagram illustrating constitution of a coding controller in the prior art.
Figure 3:
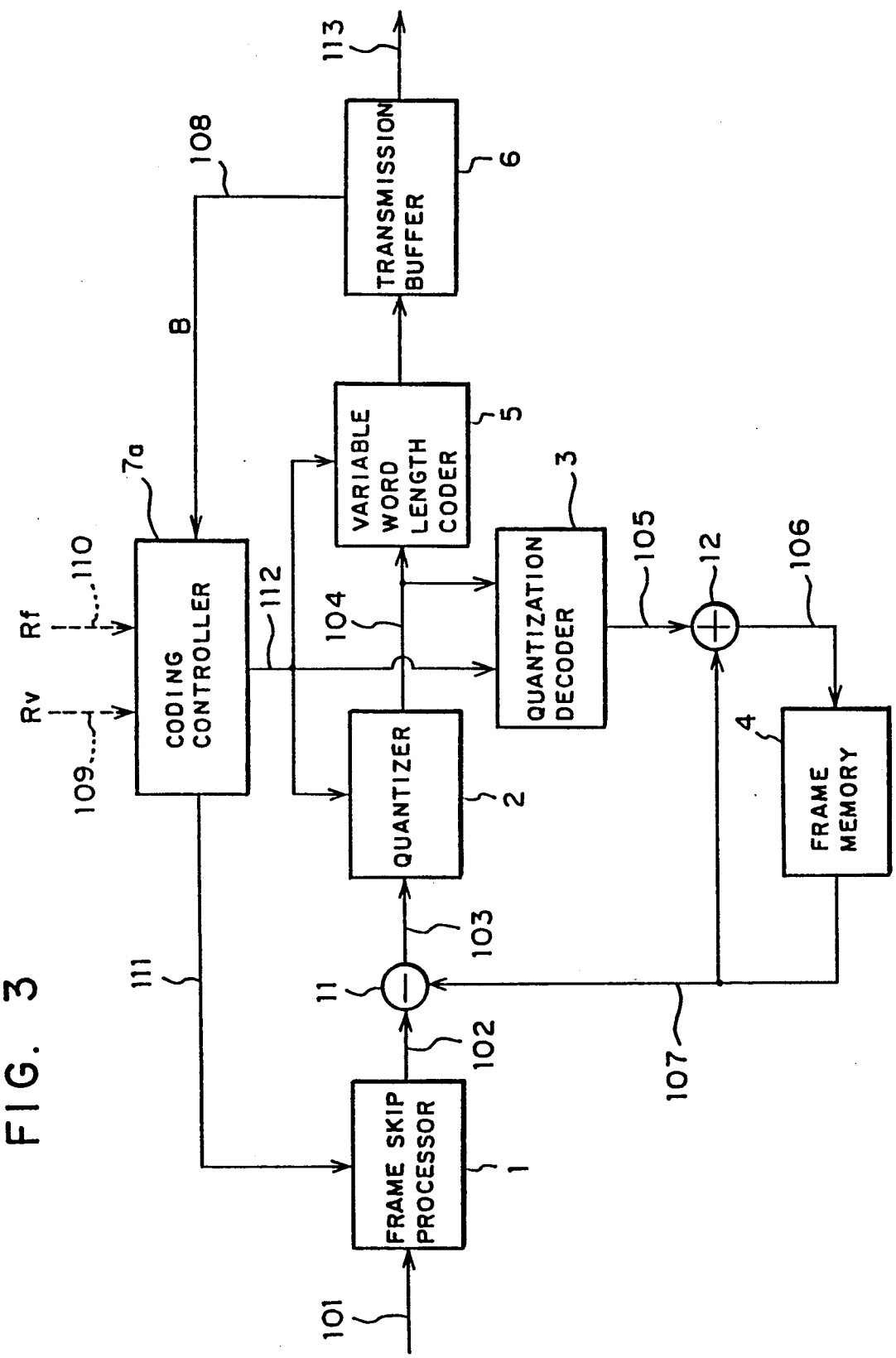
FIG. 3 is a block diagram illustrating constitution of a picture coding apparatus as an embodiment of the invention.
Figure 4:
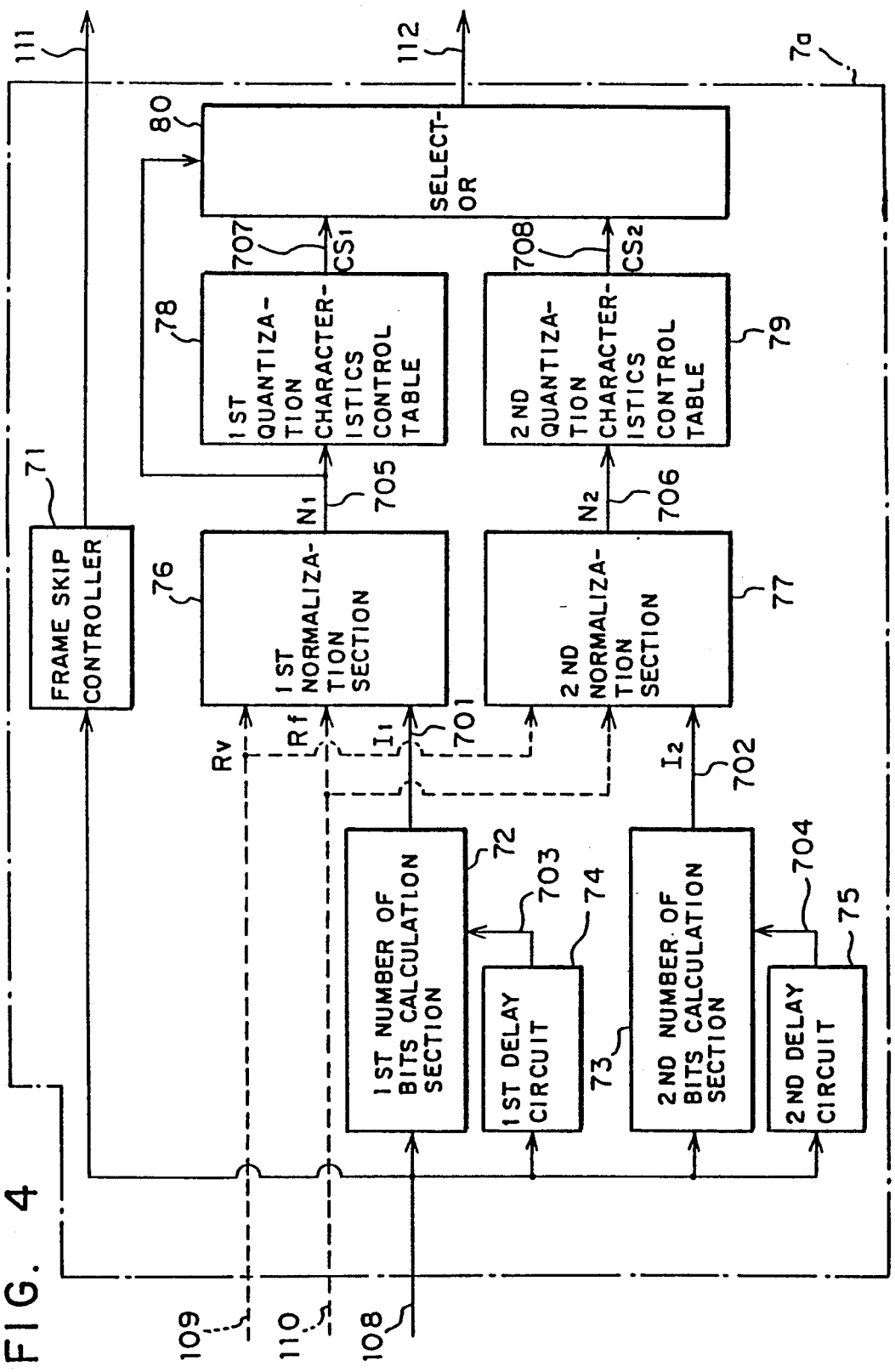
FIG. 4 is a block diagram illustrating constitution of a coding controller as an embodiment of the invention.

A preferred embodiment of the invention will now be described in detail referring to the accompanying drawings. In FIG. 3 where similar parts to those in FIG. 1 are designated by the same reference numerals, a coding controller 7a determines the number of frame skip and the quantization characteristic according to a buffer occupancy 108, a video rate 109 and a frame rate 110. FIG. 4 is a block diagram showing the constitution of the coding controller 7a in the picture coding apparatus according to an embodiment of the invention. In FIG. 4, a frame skip controller 71, for determining the number of frame skip, outputs a frame skip control signal 111. The coding controller 7a comprises a first number of bits calculation section 72 for calculating the number of bits created by coding 701 $n \times QB$; a second number of bits calculation section 73 for calculating the number of bits created by coding 702 one frame and outputting it; a first delay circuit 74 for providing delay corresponding to $n \times QB$; a second delay circuit 75 for providing delay corresponding to one frame; a first normalization section 76 for evaluating a normalized value for the number of bits 701 per $n \times QB$ which is independent of the video rate 109 and the frame rate 110; a second normalization section 77 for evaluating a normalized value for the number of bits 702 per one frame; a first quantization characteristics control table 78 for determining prescribed quantization characteristics among a plurality of quantization characteristics using the first normalized value 705 estimated by the first normalization section 76; a second quantization characteristics control table 79 for determining prescribed quantization characteristics among a plurality of quantization characteristics using the second normalized value 706 estimated by the second normalization section 77; and a selector 80 for selecting either the first quantization characteristics control signal 707 outputted from the first quantization characteristics control table 78 or the second quantization characteristics control signal 708 outputted from the second quantization characteristics control table 79 according to the first normalized value 705. Also the apparatus comprises interframe differential signal generating means 1, 11; transmission picture data output devices 2, 5, 6; decoded video signal generating devices 3, 12; first normalized value evaluating devices 72, 74, 76; and second normalized value evaluating devices 73, 75, 77.

Figure 5:
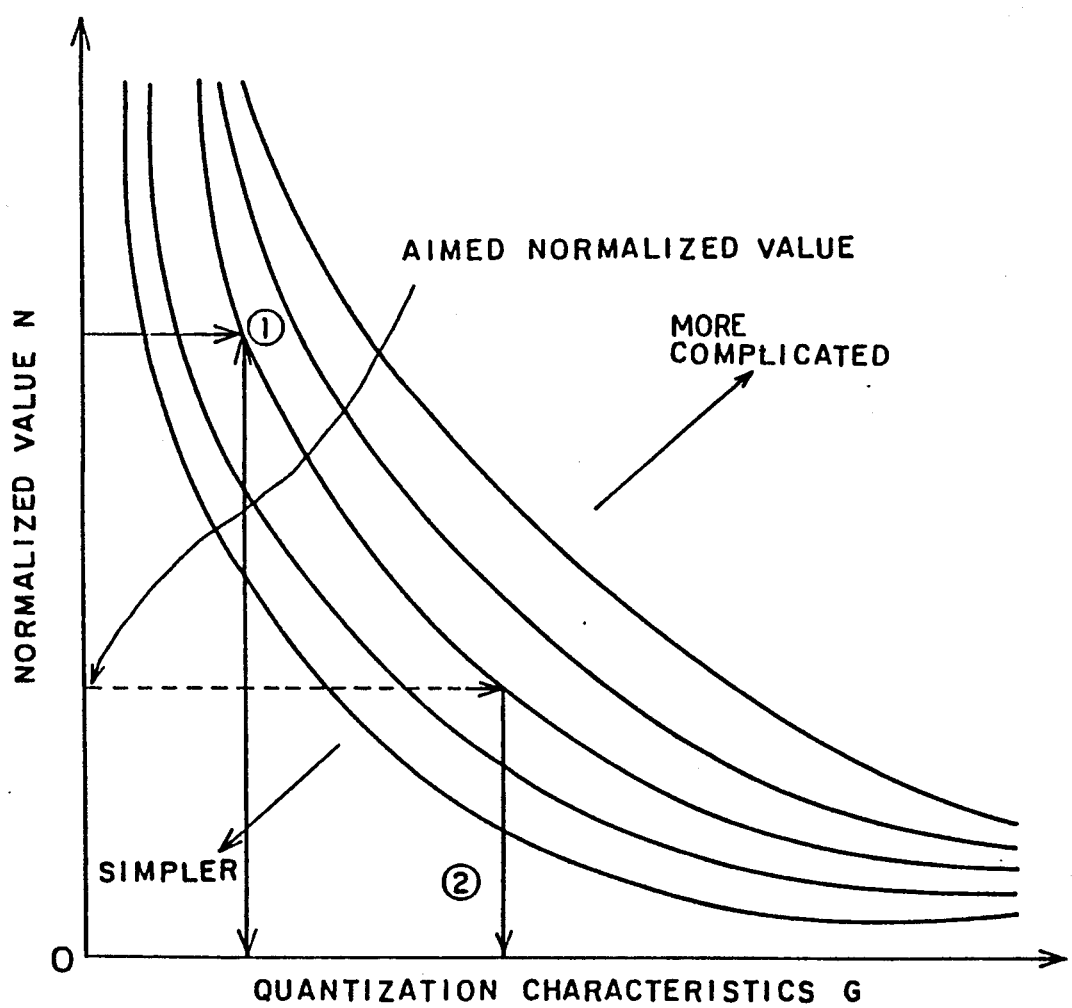
FIG. 5 is an explanation diagram illustrating relation of the quantization characteristics and the normalized number of bits created by coding.

In general, the quantization characteristics and the number of bits created by coding have relationship as shown in FIG. 5. In the picture, including a great amount of motion and very complicated patterns, the characteristic curve moves to the right upward side. On the contrary, in the picture including a small amount of motion and simple patterns, the characteristic curve moves to the left downward side. In this embodiment, several characteristic curves are previously set by a preparatory experiment, and among these curves, the characteristics corresponded to the coding results of the preceding frame (or $n \times QB$) are selected. This is made the characteristic curve in the existing frame (or $n \times QB$).

For an arbitrarily determined threshold value TH, if it follows that:

$$N_1 > N_2 + TH,$$

the coding control is changed from every frame to every block.

After $m \times n \times QB$ (m:natural number), if it is satisfied that:

$$N_1 < = N_2 + TH,$$

the coding control is changed every frame.

In this embodiment, for an arbitrarily determined threshold value TH:if it follows that:

$$N_1 < N_2 + TH;$$

the control of every frame may be changed into the control of every block, and thereby a similar effect can be obtained.

Next, operation will be described. First, in FIG. 4, in the first number of bits calculation section 72, the number of bits $I_1$ 701 per $n \times QB$ is calculated using a buffer occupancy 703 before $n \times QB$ is outputted from the first delay circuit 74, providing delay by $n \times QB$ with respect to the existing buffer occupancy 108. On the contrary, in the second number of bits calculation section 73, the number of bits $I_2$ 702 per frame is calculated using a buffer occupancy 704 before one frame is outputted from the second delay circuit 75, providing delay by one frame with respect to the existing buffer occupancy 108. In the first normalization section 76, a normalized value being independent of a video rate $R_v$ 109 and a frame rate $R_f$ 110 is calculated for the number of bits $I_1$ 701 per n×QB, and is outputted as a first normalized value $N_1$ 705. If the number of the quantization blocks per one frame is made l, relationship of the first normalized value $N_1$ 705 to the number of bits $I_1$ 701 per n×QB, the video rate $R_v$ 109 and the frame rate $R_f$ 110 are expressed by following formula:

$$N_1 = (l \times I_1 \times R_f)/(n \times R_v).$$

Also in the second normalization section 77, a normalized value is calculated for the number of bits $I_2$ 702 per one frame, and is outputted as a second normalized value $N_2$ 706'.

$$N_2 = (I_2 \times R_f)/R_v.$$

In the first quantization characteristic control table 78 and in the second quantization characteristic control table 79, prescribed quantization characteristics are determined among a plurality of quantization characteristics using the first normalized value $N_1$ 705 and the second normalized value $N_2$ 706 respectively. The determining procedure of the quantization characteristics as shown in FIG. 5, is in that ① a suitable characteristic curve is selected among a plurality of characteristic curves indicating the relationship of the quantization characteristics and the normalized value according to the previous relationship of the quantization characteristics and the normalized value, and ② the quantization characteristics corresponding to the aimed normalized value $N_t (=1)$ are determined using the selected characteristic curve. In the selector 80, either the first quantization characteristics control signal $CS_1$ 707 or the second quantization characteristics control signal $CS_2$ 708, which were determined in the first quantization characteristics control table 78 and the second quantization characteristics control table 79, respectively, is selected using the first normalized value $N_1$ 705, and is outputted as a quantization control signal 112:

$N_1$:large→select $CS_1$ $N_1$:small→select $CS_2$.

Other parts are processed in manner similar to the prior art.

In this embodiment, although the control every n×QB and the control every frame are changed according to the normalized value of the number of bits created by coding, in the selection of the control units of n×QB/frame, the variance of number of bits created by coding may be used as the criterion together with the number of bits created by coding. Thereby, more suitable coding control becomes possible.

According to the invention as above described, as units of the coding control, the first quantization characteristics control signal performing the control every n×QB is generated by the first normalized value evaluating means and the first quantization characteristics control table. Further, the second quantization characteristics control signal performing the control every frame is generated by the second normalized value evaluating means and the second quantization characteristics control table. Also, and either quantization characteristics control signal is selected to change the control unit by the selector according to number of bits created by coding in order to thereby affect exist in that the local deterioration of the picture quality is prevented. Further, the delay of the coding control is decreased and the high efficiency digital video signal can be performed.

What is claimed is:

1. A picture coding apparatus comprising differential signal generating means for outputting a differential signal from a digitized input picture data and a prediction signal, transmission picture data output means for quantizing and coding the differential signal using a quantization characteristics control signal, and for outputting transmission picture data, decoded picture signal generating means for decoding a quantization index based upon the quantization characteristics control signal and the decoded differential signal and for outputting a decoded picture signal from the decoded differential signal and the prediction signal, a memory for storing the decoded picture signal and for outputting a delayed version of the prediction signal, and a coding controller for receiving a buffer occupancy from a buffer of said transmission picture data output means and for outputting a quantization characteristics control signal, said coding controller comprising:
first calculation means for calculating a number of bits created by coding a first prescribed processing unit;
second calculation means for calculating a number of bits created by coding a second prescribed processing unit; and
determination means for determining the quantization characteristics of at least one of the first and second prescribed processing units among a plurality of quantization characteristics using an output from said first and second calculation means and for outputting the quantization characteristics control signal.

2. The picture coding apparatus of claim 1, wherein said coding controller further comprises:
a frame skip control means for outputting a frame skip control signal according to a buffer storage amount;
first quantization characteristics control means for selecting and outputting one of a plurality of quantization characteristics according to an output of said first calculation means; and
second quantization characteristics control means for selecting and outputting one of a plurality of quantization characteristics according to an output of said second calculation means,
said first calculation means calculating a variation of buffer occupancy every quantization block (QB) of a prescribed number (n:natural number),
said second calculation means calculating a variation of buffer occupancy every frame,
said determining means selecting one of said first and second quantization characteristics control means and outputting the quantization characteristics control signal according to an output from one of said first and second calculation means.

3. The picture coding apparatus of claim 1 or claim 2, wherein said coding controller further comprises:
first and second information amount normalization means for normalizing outputs from said first and second calculation means into an amount which is independent of video rate, frame rate and size of the processing unit,
said determining means determining prescribed quantization characteristics of a plurality of quantization characteristics using outputs $N_1$ and $N_2$ from said first and second information amount normalization means respectively, and outputting the quantization characteristics control signals.

4. The picture coding apparatus of claim 3, wherein if $N_1 > N_2 + TH$, for an arbitrarily determined threshold value TH, said determining means outputs the quantization characteristics control signal for changing the coding control unit from the second prescribed processing unit into the first prescribed processing unit, and if $N_1 \leq N_2 + TH$ after coding $m \times n \times QB$ (n:natural number), said determining means outputs the quantization characteristics control signal for changing the coding control unit from the first prescribed processing unit into the second prescribed processing unit.

5. The picture coding apparatus of claim 3, wherein if $N_1 < N_2 + TH'$ for an arbitrarily determined threshold value TH', said determining means outputs the quantization characteristics control signal for changing the coding control unit from the first prescribed processing unit into the second prescribed processing unit, and if $N_1 \geq N_2 + TH'$, after coding $m \times n \times QB$ (m:natural number), said determining means outputs the quantization characteristics control signal for changing the coding control unit from the second prescribed processing unit into the first prescribed processing unit.

6. A coding controller for use in a picture coding apparatus which includes a variable word length coder for allocating the coded signals to digitized signals and a transmission buffer for temporarily storing the coded signals of varied lengths and for outputting a buffer occupancy signal, the coding controller comprising:

first calculation means for receiving the buffer occupancy signal and for calculating and subsequently outputting a signal indicative of a number of bits for coding a block of image data;

second calculation means for receiving the buffer occupancy signal and for calculating and subsequently outputting a signal indicative of a number of bits for coding a frame of image data;

determination means for determining quantization characteristics of each of the signals output the first and second calculation means and for outputting a first and second quantization characteristics control signal; and selection means for selecting one of the first and second quantization characteristics control signals to thereby control coding of image data by the selected one of blocks and frames.

7. The coding controller of claim 6, wherein the selection means continuously selects coding by one of blocks and frames for continuously input image data to thereby variably code image data by blocks and frames.

8. The coding controller of claim 6, wherein the determination means comprises:

first determination means for determining quantization characteristics of the signal output from the first calculation means; and second determination means for determining quantization characteristics of the signal output from the second calculation means.

9. The coding controller of claim 8, wherein the first and second determination means each include quantization characteristics control tables including a plurality of predetermined quantization characteristic signals.

10. The coding controller of claim 9, wherein the quantization characteristics in each of the first and second determination means are determined based upon a previously determined signal.

11. A coding control method for continuously selecting coding by blocks or frames of input image data in a picture coding device including a variable word length coder and a transmission buffer for temporarily storing coding signals of varying lengths and for outputting a buffer occupancy signal, the coding control method comprising the steps of:

(a) receiving the buffer occupancy signal in a first calculation device and calculating, and subsequently outputting a signal indicative of a number of bits for coding a block of input image data;

(b) receiving the buffer occupancy signal in a second calculation device and calculating, and subsequently outputting a signal indicative of a number of bits for coding a frame of input image data;

(c) determining quantization characteristics of each of the signals output from the first and second calculation devices and outputting first and second quantization characteristics control signals; and (d) selecting one of the first and second quantization characteristics control signals to thereby control coding by the selected one of blocks or a frame of image data.

12. The coding control method of claim 11, wherein steps (a)–(d) are repeated for each input data to continuously select coding by a block or a frame of image data.

* * * * *